Jan. 13, 1953  J. N. KEMPH  2,624,948
PIVOTED CONTACT MEASURING TOOL
Filed July 5, 1947
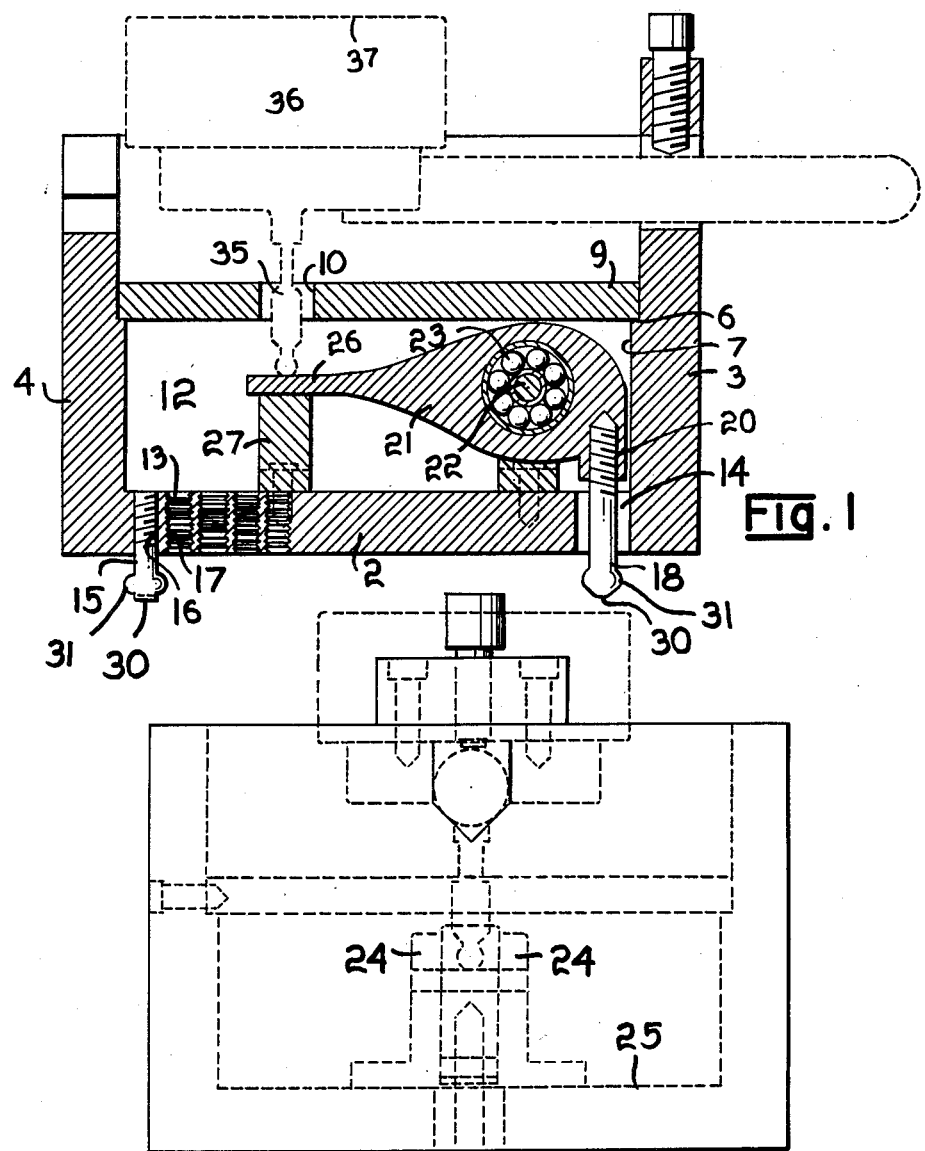
Fig. 1
Fig. 2
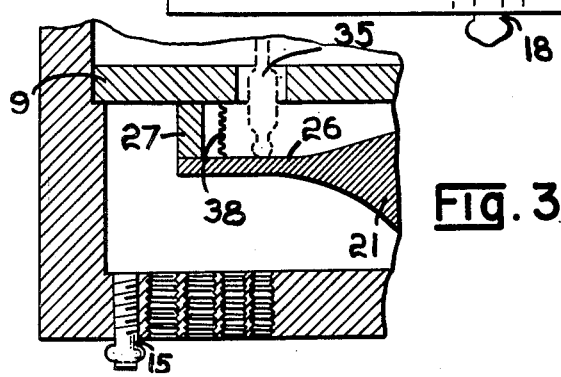
Fig. 3
JOSEPH N. KEMPH
INVENTOR.
BY Lester B. Clark
& Ray L. Smith
ATTORNEYS Patented Jan. 13, 1953

2,624,948

UNITED STATES PATENT OFFICE 2,624,948

PIVOTED CONTACT MEASURING TOOL

Joseph N. Kemph, Houston, Tex.

Application July 5, 1947, Serial No. 759,263

1 Claim. (Cl. 33—148)

The invention relates to a measuring device.

An object of the present invention is to provide a device for measuring widths, diameters, thicknesses or the like of various sized articles.

Another object of the invention is to provide a device having means for indicating the size of various objects.

Still another object of the invention is to provide a device for measuring and indicating the diameter of cylinder bores and the like.

A further object of the invention is to provide a device which is of simple construction and which is easy to operate.

A further object of the invention is to provide a device for measuring the size of various objects which is easily manufactured and readily adaptable to practical use.

A still further object of the invention is to provide an instrument which is accurate and dependable.

Other and further objects of the invention will become more readily apparent from a consideration of the following description and drawings, wherein:

Fig. 1 is a vertical closed section showing an arrangement of the invention.

Fig. 2 is an end view showing an interior construction of the invention in dotted line.

Fig. 3 shows a modification of a construction of the invention.

The invention is shown in Fig. 1 as comprising a support member 2, connected to the side walls 3 and 4 so as to form a housing for the working parts of the device. A shoulder 6 on the inner periphery 7 of the wall members 3 and 4 is arranged so as to receive the partition member 9, having a hole 10 therethrough.

A space 12 is thereby provided between the support member 2 and housing 9. Communicating with the space 12 through the support member 2 are a plurality of openings 13 on one side of the support member and spaced from the opening 14 in the other side of the support member.

In one of the openings 13 is a downwardly extending prong 15 which is secured by any suitable means such as the threads 16 on the prong 15 and the co-fitting threads 17 on the inner periphery of the hole 13. A second prong 18 extending downwardly through the platform member 2 is engaged in the end 20 of an arm 21 which is pivoted on the bar 22 by the ball race 23.

The bar 22 is mounted on the brackets 24, which in turn are mounted on the surface 25 of the platform member 2. The end 26 of the arm 21 is arranged to normally rest on the post 27 which is mounted on the surface 25 of the platform member 2 and extends upwardly therefrom a spaced distance from the brackets 24.

Adjacent the ends 30 of the prongs 15 and 18 is an annular beaded surface 31 on the periphery thereof. When the device is not in use, it will be substantially in the position as shown in Fig. 1.

To take a measurement of a cylinder bore or of a hole in a jig drill plate or to measure the inner diameter of a tubular object, the device will be inserted in such hole cylinder or pipe, in accordance with the hereinafter description of operation.

The prongs will be spaced apart a suitable distance before insertion so that when the device is inserted in the cylinder bore or the like, the bead 31 on the end of the prongs 15 and 18 will be forced to contact the periphery of the cylinder bore or the like and the prong 18 will thereby be pivoted toward the prong 15 so that it may pass into the cylinder bore.

As the prong 18 is pivoted in this manner, the arm 21 will be tilted, whereby the end 26 thereof moves upwardly and contacts the downwardly extending finger 35 of the measuring instrument 36 shown in dotted outline in Fig. 1.

The reading on the face 37 of the dial 36 will, of course, be proportionate to the movement of the finger 35 and the arm 21. Any suitable dial indicator may be used and a Starrett dial test indicator is illustrated in the drawings.

Fig. 3 shows a construction that may be used to measure the external diameter, width, thickness or the like of various sized articles. In this form of the construction, the post 27 is removed from below the end 26 of the arm 21 and is positioned on the partition member 9 so that it extends downwardly into contact with the end 26 of the arm 21.

Suitable means, such as a spring 38 connected on the partition member 9 and to the end 26 of the arm 21, normally retains the arm 21 so that the finger 35 is in a non-indicating position. When the device is positioned downwardly over the object to be measured, the prong 18 is pivoted away from the prong 15, whereby the arm 21 and the end 26 thereof move downwardly.

This downward movement effects a movement in the finger 35 of the indicator 36 so that a reading is obtained.

While the prong 15 is shown as being positioned in the outermost hole away from the prong 18, it seems obvious that the prong 15 can be secured in any of the holes 13, whereby objects of different size may be measured.

The construction of the support member may be of any suitable form to accomplish the desired results of the invention, it being only necessary that the support member have a prong removably secured therein, with one or more prongs being pivotally mounted on the support member, whereby the movement of the pivoted prong gives a reading on the indicator of the measurement being taken.

A form of the invention as described has been used to measure the diameter openings and size of objects from $\frac{5}{16}$ inch up to $2\frac{1}{4}$ inches. Larger objects could be measured with the invention by changing the size of the support member 2.

Broadly the invention contemplates a measuring device adapted to measuring diameters of bores, widths of objects and the like.

What is claimed is:

A device for measuring the diameter of small bore objects comprising a cup-shaped support member having a bottom and connected sides, there being an opening in the bottom of said member, an arm pivotally mounted adjacent said opening and adapted to oscillate up and down in said cup-shaped member, the pivot for said arm including a pair of brackets secured to the bottom of said member and extending upwardly therefrom, a rod extending horizontally therebetween, and a ball bearing race surrounding said rod and pivotally supporting said arm, a prong secured to the bottom of said member and extending downwardly therefrom, a second prong secured in one end and on the bottom side of said arm and extending vertically downwardly therefrom and through the opening in the bottom of said member, said prongs co-acting to contact the wall of a small bore opening, and said second prong and connected arm oscillating in accordance with variations in the diameter of the bore wall so contacted, and indicator means mounted on said housing and contacting the upper side of the opposite end of said arm whereby oscillations of said arm as indications of variations of the bore wall diameter are transmitted to said indicator.

JOSEPH N. KEMPH.

REFERENCES CITED

The following references are of record in the file of this patent:

UNITED STATES PATENTS

| Number | Name | Date |
| --- | --- | --- |
| 439,774 | Durand | Nov. 4, 1890 |
| 1,206,202 | Bright | Nov. 28, 1916 |
| 1,274,331 | Rockwell | July 30, 1918 |
| 1,308,324 | Bellard | July 1, 1919 |
| 1,726,129 | Steinle | Aug. 27, 1929 |
| 2,024,020 | Aldeborgh | Dec. 10, 1935 |
| 2,282,114 | Brister | May 5, 1942 |
| 2,348,018 | Moore | May 2, 1944 |
| 2,415,693 | Ingle | Feb. 17, 1947 |
| 2,448,106 | Mannerbrink et al. | Aug. 31, 1948 |

FOREIGN PATENTS

| Number | Country | Date |
| --- | --- | --- |
| 580,562 | Great Britain | Sept. 12, 1946 |